Patented Aug. 14, 1928.

1,680,760

UNITED STATES PATENT OFFICE.

MAURICE ERNEST BOUVIER AND LUCIEN HUGONIOT, OF LYON, FRANCE, ASSIGNORS TO SOCIETE CHIMIQUE DES USINES DU RHONE, OF PARIS, FRANCE.

PROCESS FOR THE PREPARATION OF ETHYLIDENE DIACETATE.

No Drawing. Application filed August 18, 1925, Serial No. 51,038, and in France June 13, 1925.

It is known that acetic acid fixes acetylene in presence of a mercury salt, with formation of ethylidene diacetate, together with a more or less large quantity of vinyl acetate.

In all the processes described in the literature belonging to the art (and particularly in those which form the object of the French Patent No. 487,402 dated 9th December 1916, and of the German Patent No. 271,381 dated 22 June 1912) the formation of vinyl acetate is noticeable if the reaction takes place at a relatively low temperature, up to approximately 70° C. It is possible to avoid this formation of vinyl acetate by working at a higher temperature, but the production of tars then becomes important. No process satisfactory from every point of view has been described hitherto.

Applicants have observed that it is possible to operate at a high temperature and nevertheless to avoid the formation of tars by absorbing the acetylene in presence of the mercury salt of a strong acid, such as sulphuric, sulpho-acetic, benzene-sulphonic, naphthalene-sulphonic and like acids, and in presence of a strong free acid, which may be different from that which gave the mercury salt, on the condition that the operation is performed in presence of acetic anhydride in such quantity that there is always in the liquid intended for the absorption of the acetylene an excess of acetic anhydride. This presence of acetic anhydride is essential: all other conditions being the same, a liquid for the absorption of the acetylene, raised to 80–90° C. and not containing any anhydride, blackens very rapidly and the acetylene soon ceases to be absorbed, while the same mixture to which a little (5%) anhydride has been added becomes brown only gradually and the total formation of tars is practically negligible, even when most of the acetic acid is combined.

The new process may be carried out as follows: 2000 kgs. of acetic acid are introduced into an apparatus provided with efficient stirring means. To this are added 24 kgs. of freshly prepared mercuric sulphate, 94 kgs. of sulpho-acetic acid and 100 kgs. of acetic anhydride. The mixture is raised to a temperature of about 90° C. and it is made to absorb 346 kgs. of acetylene that is, about 80% of what could be absorbed by the whole of the acetic acid introduced. The mercury and the mercury salts in suspension are separated from the liquid, by known methods. The liquid is free from vinyl acetate and contains the 20% acetic acid in excess, the anhydride, the sulpho-acetic acid introduced at the beginning, the ethylidene diacetate formed and a minute amount of tars. These different constituents are separated by a suitable rectification and in this manner an excellent yield of pure ethylidene diacetate, melting at 18.9° C., density at 25° C.= 1.070, refraction index for sodium D line $nD\ 25°=1.3985$, is obtained.

This process has moreover the very desirable advantage of requiring only a small quantity of mercury. This quantity, in fact, does not exceed 1% of the weight of initial acetic acid, while in the known process, it is necessary to use about 4% of this metal.

What we claim and desire to secure by Letters Patent is:—

1. A process of preparing ethylidene diacetate by absorption of acetylene in acetic acid in the presence of a mercury salt, which consists in carrying out the reaction at a temperature below the boiling point of the liquid in the presence of a strong acid and of acetic anhydride in such quantity that, when the absorption is completed, there still remains some acetic anhydride in the liquid.

2. A process of preparing ethylidene diacetate by absorption of acetylene in acetic acid in the presence of a mercury salt, which consists in carrying out the reaction at a temperature below 105° C. in the presence of a sulphonic acid and of acetic anhydride in such quantity that, when the absorption is completed, there still remains some acetic anhydride in the liquid.

3. A process of preparing ethylidene diacetate by absorption of acetylene in acetic acid in the presence of a mercury salt, which consists in carrying out the reaction at a temperature below 105° C., in the presence of sulpho-acetic acid and of acetic anhydride in such quantity that, when the absorption is completed, there still remains some acetic anhydride in the liquid.

4. A process of preparing ethylidene diacetate by absorption of acetylene in acetic acid, which consists in carrying out the reaction at a temperature between 60 to 105° C., in the presence of mercuric sulphate, free sulpho-acetic acid and acetic anhydride in such quantity that, when the absorption is completed, there still remains some acetic anhydride in the liquid.

5. A process of preparing ethylidene diacetate by absorption of acetylene in acetic acid in the presence of mercuric sulphate, sulpho-acetic acid and acetic anhydride, the said absorption being carried out at a temperature of 80°–90° C.

In testimony whereof we have signed our names to this specification.

MAURICE ERNEST BOUVIER.
LUCIEN HUGONIOT.